(12) United States Patent
Miettinen et al.

(10) Patent No.: US 6,400,555 B2
(45) Date of Patent: Jun. 4, 2002

(54) ARRANGEMENT FOR FASTENING AND PROTECTING A CAPACITOR

(75) Inventors: Osmo Miettinen; Jukka Jaskari, both of Vaasa (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 09/796,826

(22) Filed: Mar. 2, 2001

(30) Foreign Application Priority Data

Mar. 10, 2000 (FI) .............................................. 20000556

(51) Int. Cl.⁷ ................................................ H01G 2/10
(52) U.S. Cl. ...................................... 361/517; 361/535
(58) Field of Search ................................ 361/272, 328, 361/517–519, 522, 534–538, 541

(56) References Cited

U.S. PATENT DOCUMENTS 2,897,418 A * 7/1959 Call
3,346,783 A * 10/1967 Millard
3,593,066 A * 7/1971 Norman, Sr. ................ 361/522
6,021,040 A * 2/2000 Suzuki et al. ................ 361/514
6,256,188 B1 * 7/2001 Loukuist et al.

FOREIGN PATENT DOCUMENTS

DE    197 23 455    10/1998
JP    A 5-198457    8/1993
JP    A 6-236825    8/1994

OTHER PUBLICATIONS

Oct. 10, 2000 Office Action for corresponding Finnish application No. 20000556 filed Oct. 3, 2000.

* cited by examiner

Primary Examiner—Anthony Dinkins
(74) Attorney, Agent, or Firm—Oliff & Berridge, PLC

(57) ABSTRACT

An arrangement for fastening a capacitor to an electrotechnical device and for protecting the capacitor from stresses caused by the environment. The arrangement includes a disk-like frame, one or more openings pierced in the frame, a capacitor to be fastened to each opening and one or more substantially hollow domed fastening and protection means, inside of which one of the capacitors is arranged, wherein each of the fastening and protection means is arranged into one of the openings in the frame.

14 Claims, 2 Drawing Sheets

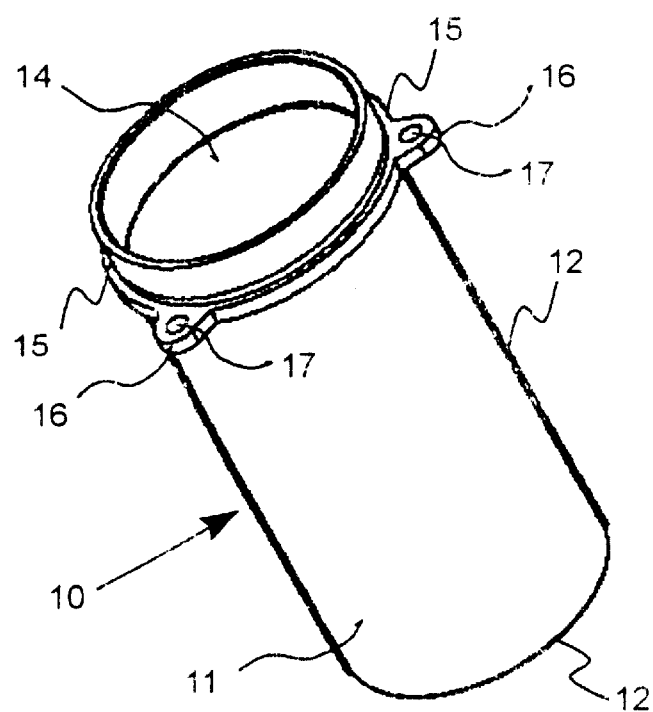
FIG. 2A
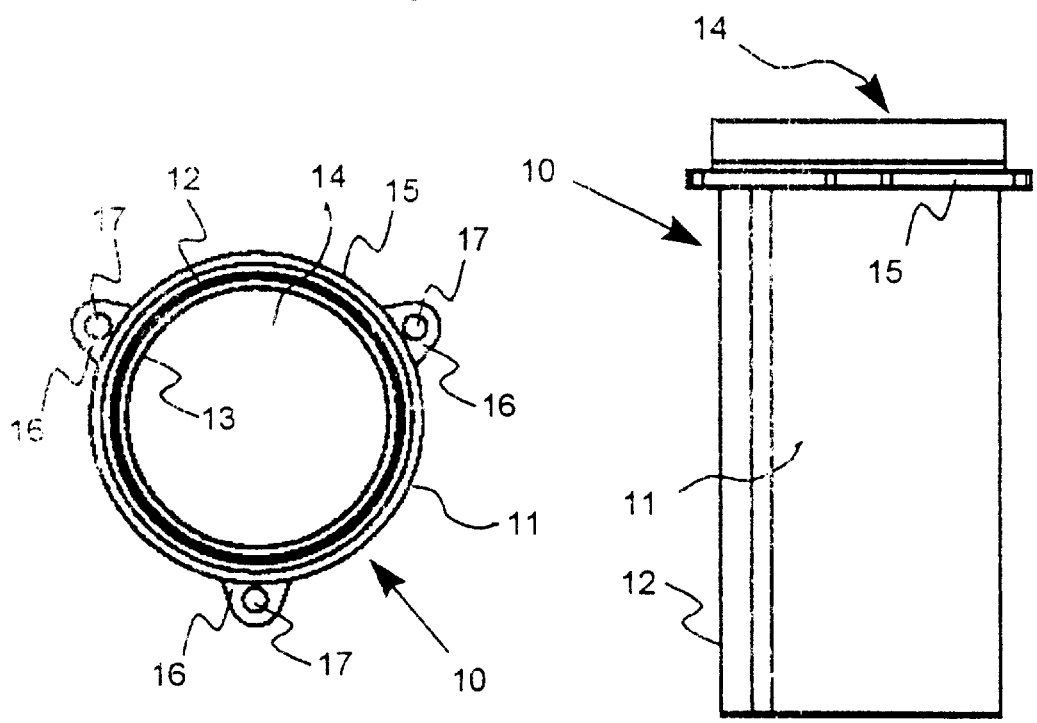
FIG. 2B
FIG. 2C

ARRANGEMENT FOR FASTENING AND PROTECTING A CAPACITOR

FIELD OF THE INVENTION

The invention relates to an arrangement for fastening and protecting a capacitor, the arrangement allowing a capacitor to be fastened to a place of installation and protected from stress caused by the environment.

BACKGROUND OF THE INVENTION

Such a fastening and protection arrangement can be used in an electrotechnical device, for example for fastening the capacitors in a frequency converter to the attaching parts of the device and for protecting the capacitors from stress caused by the environment, such as moisture.

It is previously known to fasten capacitors comprised by a device to a clip plate by means of different fasteners, such as clips, collars or screws. A known fastening method comprises a bolt that is fastened to a capacitor, usually to the end opposite to its poles, and from which the capacitor is fastened with nuts to a clip plate underneath it.

However, such prior art fastening solutions are problematic, since a suitably sized fastener always has to be available or, for screw fastening, a screw has to be attached or attachable to the capacitor. Furthermore, technically, from the point of view of installation, such fastening is time-consuming. Also, prior art fastening solutions do not protect the capacitor at all from stress caused by the environment, such as moisture, dust, gases or the like.

BRIEF DESCRIPTION OF THE INVENTION

The object of the present invention is to eliminate prior art drawbacks and to provide a novel solution for fastening a capacitor to an electrotechnical device, which solution also protects the capacitor efficiently against stress caused by the environment.

This is achieved by an arrangement for fastening and protecting a capacitor in accordance with the present invention having the characteristics defined in the claims. More exactly, the arrangement of the invention is mainly characterized by what is stated in the characterizing part of claim 1.

The preferred embodiments of the invention are disclosed in the dependent claims.

The basic idea of the invention is to accommodate a capacitor to a cuplike fastening and protection means, which is fastened to an attaching part of an electric device, such as a clip plate. This way the fastening and protection means preferably simultaneously acts as a fastener for the capacitor, i.e. when installed in place in the fastening and protection means, the capacitor remains in position in its place of installation. Secondly, the fastening and protection means resting against the outer surface of the casing of the capacitor protects the capacitor efficiently against environmental stress. The fastening and protection means is made from a dielectric gastight and water-tight material, such as plastic or a corresponding polymer, whereby the fastening and protection means of the invention preferably constitutes an electric insulation and a gastight and watertight insulation around the capacitor. Furthermore, the fastening and protection means tends to prevent the capacitor parts from spreading and an electric arc from being generated within the casing of the electric device, should the capacitor for some reason blow into pieces because of an electric interference impulse.

The arrangement of the invention provides a plurality of advantages. The fastening and protection means of the invention can be made simply and inexpensively for example by molding a suitable plastic.

The casing of the fastening and protection means preferably comprises only one opening, i.e. an opening from which the capacitor is accommodated to the inside of the fastening and protection means. This renders the means tight and efficiently insulating.

A fastening collar is provided close to the opening on the outer surface of the casing of the fastening and protection means. The fastening collar enables easy installation and fastening of the fastening and protection means to the attaching parts of the electric device, since the fastening collar preferably supports the fastening and protection means in the opening of the attaching part. This is achieved by dimensioning the fastening collar substantially broader than the diameter of the outer surface of the casing of the fastening and protection means.

One or more fastening elements for fastening the fastening and protection means to the attaching part of the electric device are provided in the fastening collar. Such a fastening element is preferably a fastening lug provided with an opening for receiving a connecting means, such as a screw, by means of which the fastening and protection means is arranged to be fastened to the attaching part of the electric device. The one or more fastening elements provided in the fastening collar are disposed asymmetrically in the fastening collar. This provides the significant advantage that the fastening and protection means, in which a capacitor is preferably already arranged, can be fastened to the attaching part of the electric device only in a certain direction, whereby a backwards electric coupling of the capacitor can be preferably eliminated thus eliminating damage to it during installation.

The diameter of the inner surface of the casing of the fastening and protection means is preferably dimensioned such that the capacitor fits tightly against the inner surface of the casing when placed in the fastening and protection means. Such tight fitting provides significant advantages in cooling a capacitor, since no heat-insulating air gap remains between the casing of the capacitor and the fastening and protection means, but heat is allowed to efficiently pass to the cooling air, gas or liquid flowing outside the fastening and protection means through the casing of the fastening and protection means.

The fastening collar of the fastening and protection means and the attaching part of the electric device are arranged to provide a tight joint surface. This is achieved by dimensioning the outer surface of the casing of the fastening and protection means exactly equal to the diameter of the fastening opening pierced in the attaching part of the device and by dimensioning the fastening collar substantially larger than the diameter of the fastening opening pierced to the attaching part of the device. This allows tight housing structures to be preferably created in the device by suitably arranging the fastening and protection means and the attaching parts of the device, some of the housing structures acting as dry spaces and some as wet spaces, in which more moisture is allowed than in the dry spaces. Depending on environmental conditions, the protection rating of dry spaces includes standard ratings up to protection rating IP65. If the tightness of the insulation is to be further improved, a seal material piece may be arranged between the fastening collar of the fastening and protection means and the attaching part of the device.

Since the designs of capacitors are often cylindrical, the structure of the fastening and protection means is preferably designed substantially cylindrical.

The use of the fastening and protection means of the invention allows the steps of capacitor installation to be reduced, resulting in a more inexpensive, faster and improved installation and a high-quality product, such as a frequency converter.

BRIEF DESCRIPTION OF THE FIGURES

In the following, the invention will be described in detail by means of the accompanying drawings, in which FIG. 2A shows a fastening and protection means for a capacitor viewed obliquely in the longitudinal direction, FIG. 2B is a transverse view of a fastening and protection means for a capacitor, viewed on the side of the opening, and FIG. 2C shows a fastening and protection means for a capacitor, viewed in the longitudinal direction.

DETAILED DESCRIPTION OF THE INVENTION

An example of the structure and operation of a typical arrangement for fastening and protecting a capacitor will be described with reference to FIGS. 1A to 2C.

Figure 1A:
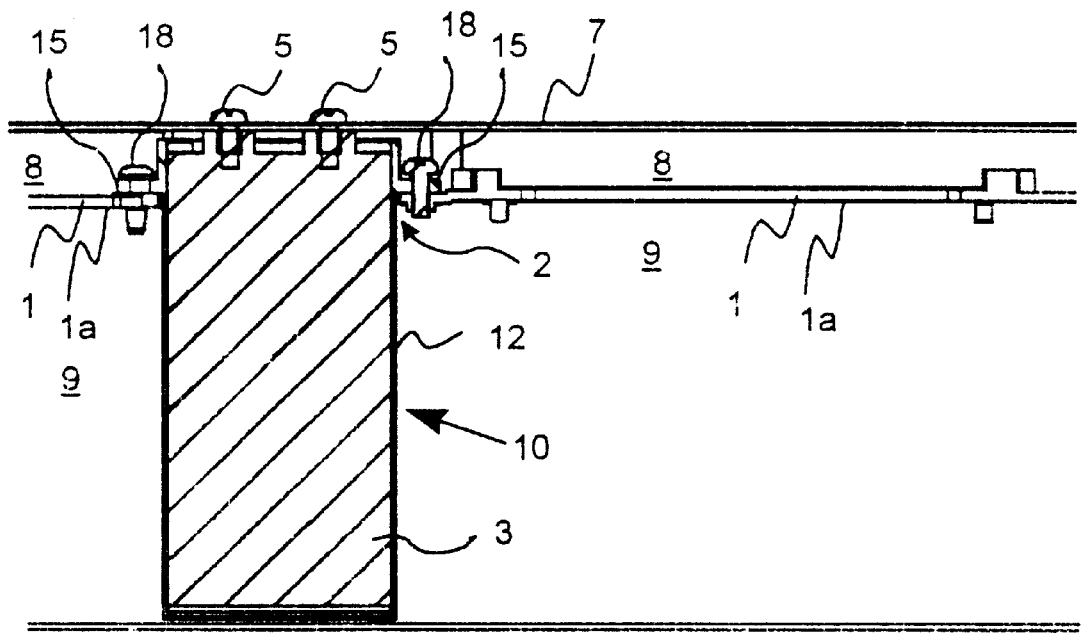
FIG. 1A shows a preferred embodiment of the arrangement for fastening and protecting a capacitor according to the invention, viewed in the longitudinal direction of the capacitor.
Figure 1B:
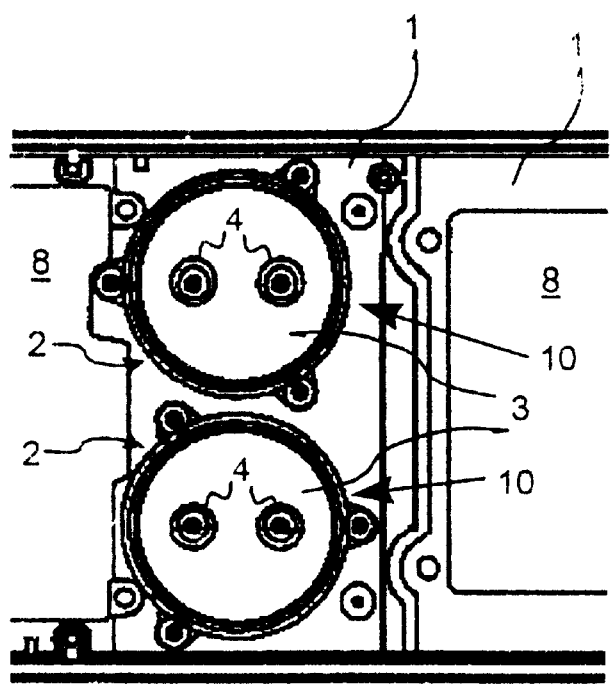
FIG. 1B shows a preferred embodiment of the arrangement for fastening and protecting a capacitor according to the invention, viewed in the direction of the poles of the capacitor.

In accordance with FIGS. 1A and 1B, the arrangement for fastening and protecting a capacitor comprises an attaching part for an electric device, i.e. typically a disk-like frame 1. The material of the frame 1 is either metal or plastic. Round openings 2 are typically pierced in the frame 1, their number being one or more depending on the number of capacitors 3. The capacitors 3 are intended to be fastened to the openings 2.

FIGS. 2A, 2B and 2C show a preferred embodiment of a fastening and protection means 10 for a capacitor. The structure of the fastening and protection means 10 is a cylindrical, hollow, cuplike fastening and protection means 10. The fastening and protection means 10 comprises a casing 11 having an outer surface 12 and an inner surface 13. The casing 11 only comprises one opening 14. Accordingly, the fastening and protection means 10 according to the embodiment is a cylinder having one open end. The capacitor is pushed to the inside of the fastening and protection means 10 from the opening 14 at the end of the cylinder. The fastening and protection means 10 comprises a fastening collar 15 close to the opening 14 on the outer surface 12 of the casing 11. The fastening collar 15 serves to support the fastening and protection means 10 in the opening 2 in the frame 1 when the fastening and protection means 10 is pushed from above into the frame 1. The fastening collar 15 is also used to fasten the fastening and protection means 10 to the frame 1.

As is apparent from FIGS. 2A, 2B and 2C, the fastening collar 15 is dimensioned clearly broader than the diameter of the outer surface 13 of the casing 11 of the fastening and protection means 10. Thus, one or more fastening elements 16 are provided in the fastening collar 15 for fastening the fastening and protection means 10 to the frame 1. In the embodiment shown in FIGS. 2A and 2B, the fastening element 16 is a fastening lug 16. An opening 17 is provided in the fastening lug 16. This allows a connecting means 18 for fastening the fastening and protection means 10 to the frame 1 to be arranged through the opening 17. The connecting means 18 may be a screw, bolt, rivet, tap or the like. The fastener 16 of the fastening collar 15 may also be shaped in some other way, such as fastening tongues, whereby the frame 1 is provided with slot-like perforations for receiving the fastening tongues.

The one or more fastening elements 16 provided in the fastening collar 15 can be disposed asymmetrically on the circumference of the fastening collar 15. This allows the fastening and protection means 10 to be fastened to the frame 1 only in a given direction, which ensures that the capacitor settles in position with its coupling poles the right way around. This enables easy elimination of erroneous capacitor couplings.

The fastening and protection means 10 is made from a dielectric gastight and watertight material. Such a material is typically plastic or a corresponding polymer.

FIG. 1A shows an arrangement for fastening and protecting a capacitor, the fastening and protection means 10 of the capacitor being preferably arranged in a site of use according to a preferred embodiment. The fastening and protection means 10 is arranged in the opening 2 in the frame 1.

The fastening and protection means 10 is pushed in position from above, the fastening collar 15 supporting the fastening and protection means 10 by resting on the edges of the opening 2. The fastening collar 15 of the fastening and protection means 10 and the frame 1 provide a tight joint surface. This is achieved by dimensioning the outer surface 12 of the casing 11 of the fastening and protection means 10 exactly equal to the diameter of the opening 2 pierced in the frame 1. Further, the fastening collar 15 is dimensioned clearly, e.g. 2 mm, broader than the diameter of the outer surface 13 of the casing 11 of the fastening and protection means 10. This provides protection up to protection rating IP65. If the sealing is to be further improved, a seal material piece, i.e. a disk-like seal or an O-ring, may be arranged between the fastening collar 15 of the fastening and protection means 10 and the frame 1. The material of the seal is preferably rubber or the like seal material.

In the arrangement for fastening and protecting a capacitor in FIG. 1A, wherein the fastening and protection means 10 of the capacitor is preferably arranged in a site of use according to a preferred embodiment, it can be detected how the fastening and protection means 10 and the attaching parts 1 of the device provide tight housing structures in the device, some of which act as dry spaces 8 and some as wet spaces 9. In the Figure, space 9, i.e. the part below the frame 1 wherein the outer surface 12 of the casing 11 of the fastening and protection means 10 of the capacitor is mainly located, is a wet space 9. Correspondingly, space 8, i.e. the part above the frame 1, wherein the inner surface 13 of the casing 11 of the fastening and protection means 10 of the capacitor, the capacitor 3, and a circuit board 7 coupled to the capacitor 3 are mainly located, is a dry space 8. It is apparent that in the presented arrangement for fastening and protecting a capacitor, the lower surface 1a of the frame 1, the outer surface 12 of the casing 11 of the fastening and protection means 10 of the capacitor, and the part located below the lower surface 1a of the frame 1 provide a wet space 9. In such a solution, components that generate lost heat in an electric device, such as the capacitors 3 in this case, can be preferably embedded in the side of the wet space 9, allowing them to be cooled efficiently by blowing cool air or other cooling gas to the wet space 9 or, if more efficient cooling is required, by circulating cooling liquid in the wet space.

The fastening and protection means 10 also generates, between the dry space 8 and the wet space 9, an electric insulation and a mechanical protective cover insulating the casing of the capacitor 3 from the wet space 9. This electric insulation prevents electric discharges between the dry space 8 and the wet space 9 via the casing of the capacitor 3. Secondly, the mechanical protective cover tends to prevent the capacitor 3 parts from spreading and an electric arc from being generated within the casing of the electric device, should the capacitor 3 for some reason blow into pieces because of an electric interference impulse. Thus, the fastening and protection means 10 also provides protection for the electric device against any explosion damage to the capacitor 3.

It is apparent from the arrangement for fastening and protecting a capacitor in FIG. 1A that the diameter of the inner surface 13 of the casing 11 of the fastening and protection means 10 is dimensioned such that the capacitor 3 fits tightly against the inner surface 13 of the casing 11 when placed in the fastening and protection means 10,. Such tight fitting ensures that no heat-insulating air gap remains between the casing of the capacitor 3 and the fastening and protection means 10, but heat is allowed to efficiently pass to the cooling air, gas or liquid flowing outside the fastening and protection means 10, i.e. in the wet space 9, through the casing of the fastening and protection means 10.

The arrangement for fastening and protecting a capacitor shown in FIGS. 1A and 1B can be assembled for example by first placing the capacitors 3 in the fastening and protection means 10 by pushing them through the opening 14 at the open end of the fastening and protection means 10 to the inside of the fastening and protection means 10 such that the poles 4 of the capacitor 3 remain visible. The fastening and protection means 10 comprising the capacitor 3 is then pushed through the opening 2 in the frame 1 into position in the frame 1, whereby the fastening and protection means 10 remains in position in the opening-2, supported by the fastening collar 15. The openings 17 of the fastening lugs 16 of the fastening collar 15 are then aligned with the openings in the frame 1, fastening screws 18 are placed in the openings 16 and the fastening screws 18 are tightened. In case the sealing between the fastening and protection means 10 and the frame 1 is critical, a sealing piece is placed on the upper surface of the frame 1 before the fastening and protection means 10 is pushed into position in the frame 1. Next, the circuit board 7 is placed in position and the poles 4 of the capacitor 3 are connected with screws 5.

It is to be understood that the above specification and the related figures are only intended to illustrate the present invention. The invention is therefore not limited only to the embodiment described above or in the claims, but different variations and modifications of the invention will be apparent to those skilled in the art, without deviating from the inventive idea disclosed in the attached claims.

What is claimed is:

1. An arrangement for fastening and protecting a capacitor, comprising:
   a disk-like frame;
   one or more openings pierced in the frame;
   a capacitor to be fastened to each opening; and
   one or more substantially hollow domed fastening and protection means, inside of which one of the capacitors is arranged, wherein each of the fastening and protection means is arranged into one of the openings in the frame.

2. An arrangement for fastening and protecting a capacitor as claimed in claim 1, wherein the fastening and protection means comprises a casing having an outer surface and an inner surface, the casing comprising only one opening for arranging the capacitor inside the fastening and protection means.

3. An arrangement for fastening and protecting a capacitor as claimed in claim 2, wherein the fastening and protection means comprises a fastening collar close to the opening on the outer surface of the casing, whereby the fastening collar is arranged to support the fastening and protection means in the opening pierced in the frame and fasten the fastening and protection means to the frame.

4. An arrangement for fastening and protecting a capacitor as claimed in claim 3, wherein the fastening collar is dimensioned substantially broader than the diameter of the outer surface of the casing of the fastening and protection means.

5. An arrangement for fastening and protecting a capacitor as claimed in claim 4, wherein one or more fastening elements are provided in the fastening collar for fastening the fastening and protection means to the frame.

6. An arrangement for fastening and protecting a capacitor as claimed in claim 5, wherein at least one of the one or more fastening elements provided in the fastening collar is a fastening lug having a pierced opening arranged to receive a connecting means by means of which the fastening and protection means is arranged to be fastened to the frame.

7. An arrangement for fastening and protecting a capacitor as claimed in claim 5, wherein the one or more fastening elements provided in the fastening collar are arranged asymmetrically in the fastening collar, whereby the fastening and protection means is arranged to be fastened to the frame in a given direction.

8. An arrangement for fastening and protecting a capacitor as claimed in claim 2, wherein the diameter of the inner surface of the casing of the fastening and protection means is dimensioned to receive the capacitor tightly against the inner surface of the casing of the fastening and protection means.

9. An arrangement for fastening and protecting a capacitor as claimed in claim 3, wherein the fastening collar of the fastening and protection means and the frame are arranged to provide a tight joint surface, whereby the outer surface of the casing of the fastening and protection means is dimensioned substantially equal to the diameter of the opening pierced in the frame.

10. An arrangement for fastening and protecting a capacitor as claimed in claim 1, wherein the fastening and protection means is substantially cylindrical.

11. An arrangement for fastening and protecting a capacitor as claimed in claim 1, wherein the fastening and protection means is made from a dielectric material.

12. An arrangement for fastening and protecting a capacitor as claimed in claim 1, wherein at least a portion of the fastening and protection means is made from a gastight and watertight material.

13. An arrangement for fastening and protecting a capacitor as claimed in claim 11, wherein at least a portion of the fastening and protection means is made from plastic or a corresponding polymer.

14. An arrangement for fastening and protecting a capacitor as claimed in claim 12, wherein at least a portion of the fastening and protection means is made from plastic or a corresponding polymer.

* * * * *